Jan. 26, 1960

A. L. SMITH 2,922,346

PHOTOGRAPHIC RECORDING DEVICES

Filed Aug. 16, 1956

INVENTOR.
ARTHUR L. SMITH
BY
ATTORNEY

Jan. 26, 1960  A. L. SMITH  2,922,346
PHOTOGRAPHIC RECORDING DEVICES
Filed Aug. 16, 1956  2 Sheets-Sheet 2

INVENTOR
ARTHUR L SMITH

BY Joseph G. Werner
ATTORNEY

United States Patent Office 2,922,346
Patented Jan. 26, 1960

2,922,346

PHOTOGRAPHIC RECORDING DEVICES

Arthur L. Smith, Madison, Wis.

Application August 16, 1956, Serial No. 604,524

1 Claim. (Cl. 95—1.1)

The present invention relates to improvements in vehicle speed recording devices or devices adapted for photographing incidents such as from a vehicle or otherwise with provisions for recording the time and/or the speed when the picture is taken from a vehicle.

Devices of the foregoing character heretofore provided have many attendant disadvantages largely because of the complexity and bulk which results from the use of prisms or other optical arrangements for recording readings of the speedometer and clock along with the picture of the principal incident on the face of the film. The present invention is intended to avoid the foregoing and other disadvantages of prior art devices and to provide vehicle speed recording apparatus of very simple construction and efficient arrangement of parts.

An object of the invention is to provide a device adapted to expose backless camera film from opposed sides thereof to produce the desired composite principal and auxiliary scenes directly from the objects thus to avoid the use of prisms and other optical arrangements.

Another object of the invention is to provide a portable battery operated device which, while primarily adapted for adjustable mounting in a vehicle, is also adapted for removal therefrom and use elsewhere when desired.

Still another object is to provide a device in which provision is made for illumination of a speedometer and clock for photographing the same only when the camera shutter is actuated or opened to photograph the principal scene.

Other objects and advantages will be apparent from the following detailed description taken in conjunction with the accompanying drawings wherein a preferred embodiment of the principles of the invention has been selected for exemplification.

In the drawings:

Fig. 3 is an electric wiring diagram for the device.

Figure 1:
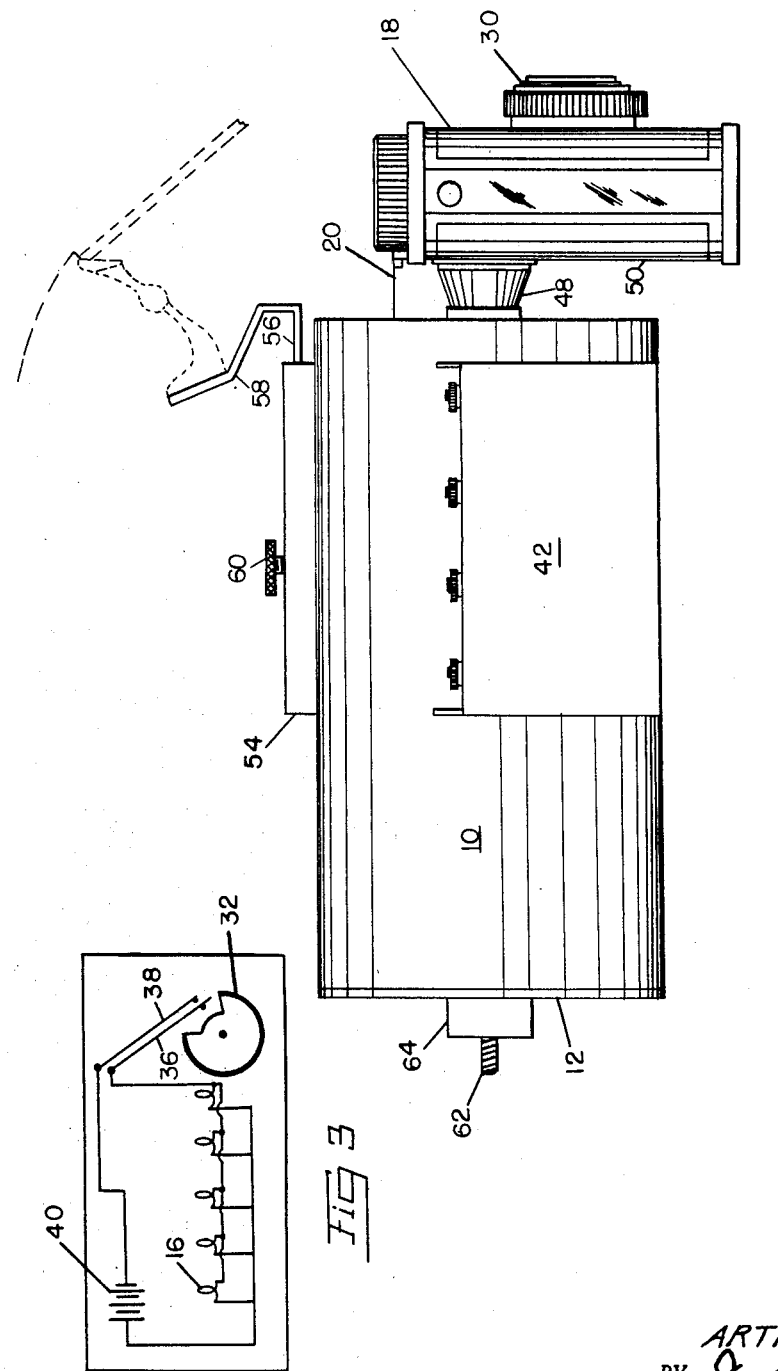
Fig. 1 is a side elevational view of a device constructed in accordance with the invention.
Figure 2:
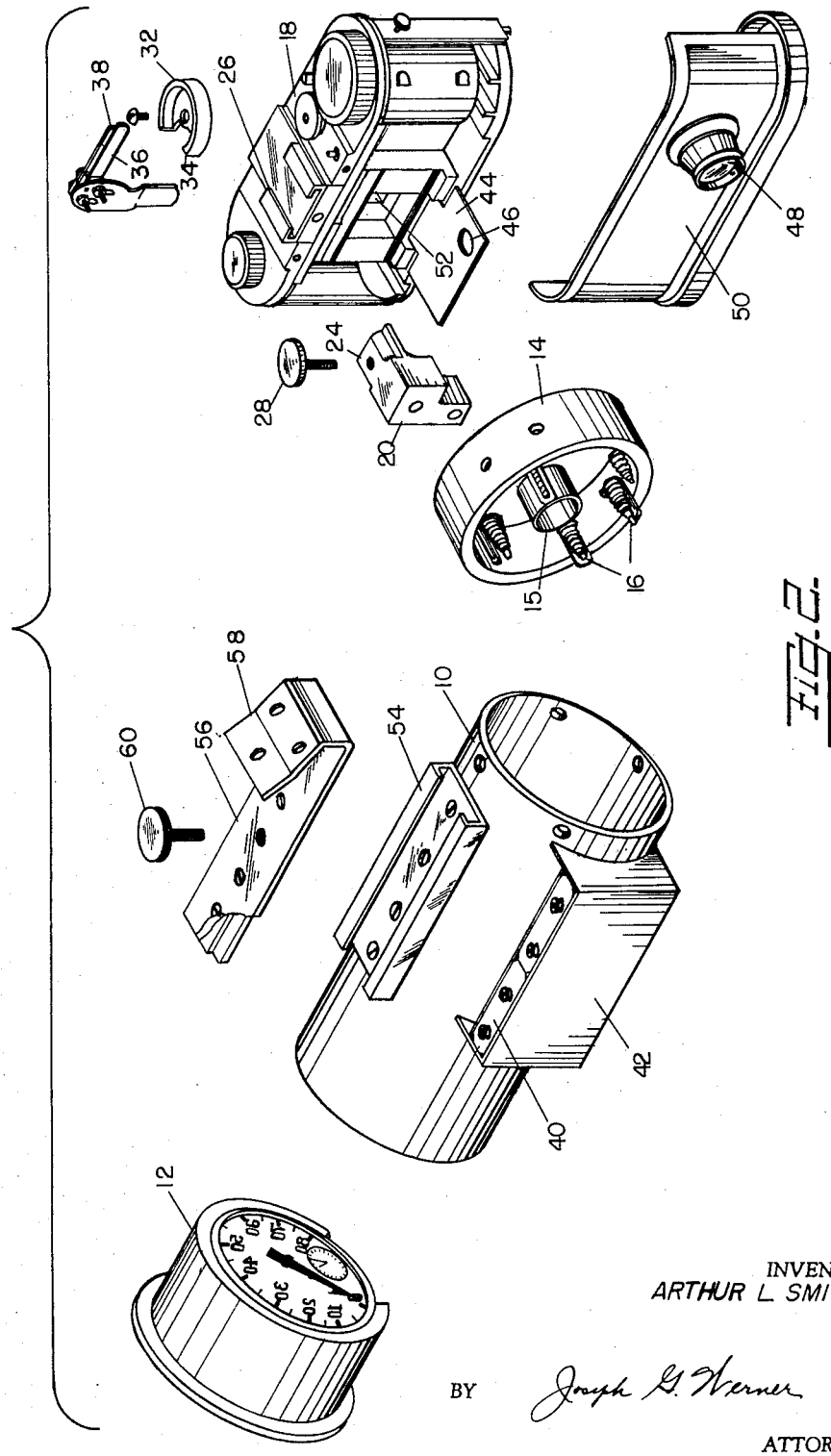
Fig. 2 is an exploded view showing in perspective the various operating elements which comprse the device shown in Fig. 1.

Referring more particularly to the drawings, wherein like numerals refer to like parts, the body of the device is composed of a housing or casing 10 in the rearward end of which is inserted and seated a speedometer and clock 12 which, for purposes apparent hereinafter, are provided with reverse dials, as shown. A head 14 having a central aperture 15 fits the forward end of casing 10 and carries electric lamps 16 for illuminating the speedometer and clock dials when it is desired photographically to record the same. The interior of the housing 10, is of course, shielded from external light.

The camera 18 may be of the 35 mm. still type for loading with backless film. A still type camera is preferred to the motion picture type because of the full frame exposure and the ease with which it may be developed and printed. A bracket 20 which is bolted or otherwise suitably secured to the forward head 14 has a projecting tongue portion 24 which seats in a mating groove portion 26 carried by the camera 18 whereby to support the camera 18 at the forward end of casing 10. Release of the thumb screw 28 permits removal of the camera for reloading.

The camera 18 is provided with the usual forward lens 30 and a shutter, preferably of the focal plane or behind the lens type. Film, driving sprockets, guides and spools may be of conventional character except that one of the spools 32 is provided with a cut-out or recessed peripheral portion having a shoulder as indicated at 34. Opposed resilient electrical contacts 36 and 38 are positioned within the camera adjacent to the periphery of the spool 32. The contacts 36 and 38 control the circuit between a battery 40 carried in a box 42 provided on the casing 10 and the electrical lamps 16 and it will be apparent that, as the camera shutter is actuated and the spool 32 rotates, the shoulder 34 thereon acts momentarily to urge contact 36 into engagement with contact 38 whereby to energize the lamp 16 and to illuminate the dials of the speedometer and clock 12.

The back pressure plate 44 of the camera 18 is provided with a hole 46 to admit light to the film from a rearward lens 48 carried by the jacket 50 of the camera and, to block the emitted light from the front of the camera, a shield 52 is provided forwardly of the film in alignment with the hole 46. The rearward lens 48, hole 46 and shield 52 are supported in axial alignment with the central aperture 15 of the head 14 and it will be apparent that the dial of the speedometer and clock 12 is photographed on the upper right hand corner of the film frame to provide the auxiliary picture simultaneously with the production of the principal picture through the front lens 30 on the remainder of the frame.

The housing or casing 10 and the camera 18 are adapted for mounting interiorly of a vehicle and, to this end, a mounting bracket is provided in the form of a channel member 54 carried at the top of the casing 10 for slidably receiving a plate 56 having an upturned forward flange 58 for attachment to the rear view mirror bracket of the vehicle, indicated in broken lines in Fig. 1. Thus, the camera 18 is mounted for universal movement and further adjustment of position can be made by selective relative positioning of the channel member 54 and plate 56 and tightening of the thumb screw 60. The housing and camera may be readily removed from the vehicle merely by loosening the screw 60 to disengage the channel support 54 from the plate 56 and by disconnecting the speedometer cable 62 from housing 64 at the rear of the speedometer 12.

It is to be understood that the present invention is not confined to the precise construction and arrangement of parts as herein illustrated and described but embraces all such modifications thereof as come within the scope of the following claim.

I claim

In combination with a camera having sides, a front and back, for use with backless film, and having a front lens and shutter and reel means for carrying the respective frames of said film behind said lens and shutter, an attachment comprising, a housing, an open lens at one end of said housing for attachment to the back of said camera in communication with the rear face of said film, shield means carried by said camera forward of and adjacent said film and forward of said open lens, a reverse subject secured inside the opposed end of said housing, means inside said housing actuated by said shutter for illuminating said reverse subject whereby simultaneously to expose the respective frames of film to pictures through the said front and rear lenses at the front and rear faces of the film, respectively.

References Cited in the file of this patent

UNITED STATES PATENTS

| | | |
|---|---|---|
| 1,490,487 | Schmidt | Apr. 15, 1924 |
| 1,722,935 | Messter | July 30, 1929 |
| 1,723,926 | Fairchild | Aug. 6, 1929 |
| 1,764,066 | Chamberlin | June 17, 1930 |
| 2,809,571 | Christensen | Oct. 15, 1957 |